T. M. BILLS & T. H. HARVEY.
AUXILIARY AIR FEED FOR CARBURETERS.
APPLICATION FILED MAY 9, 1916.
1,202,263.
Patented Oct. 24, 1916.
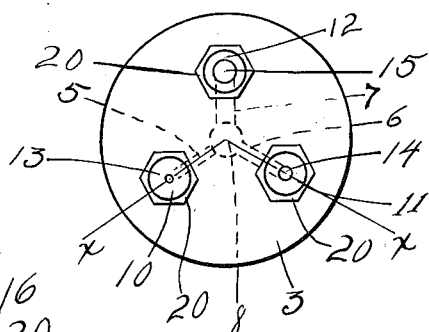
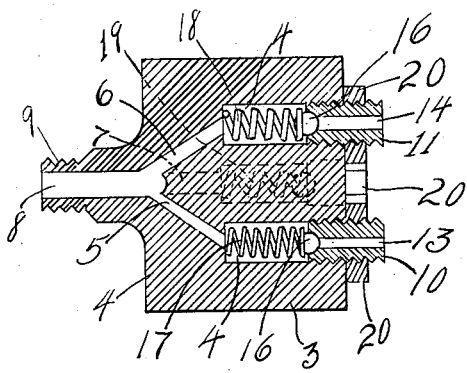

UNITED STATES PATENT OFFICE.

THOMAS M. BILLS AND THOMAS H. HARVEY, OF FORT WORTH, TEXAS.

AUXILIARY AIR-FEED FOR CARBURETERS.

1,202,263.     Specification of Letters Patent.     Patented Oct. 24, 1916.

Application filed May 9, 1916. Serial No. 96,290.

*To all whom it may concern:*

Be it known that we, THOMAS M. BILLS and THOMAS H. HARVEY, citizens of the United States, residing at Fort Worth, in the county of Tarrant and State of Texas, have invented certain new and useful Improvements in Auxiliary Air-Feeds for Carbureters, of which the following is a specification.

Our invention relates to improvements in auxiliary air feed for carbureters, and the object is to provide a simple and inexpensive check valve for the operation of gasolene engines, which will cause complete combustion by providing sufficient oxygen to explode all the particles of hydrocarbon elements, which will effect a considerable increase in power, and by which a considerable saving in fuel or gasolene is effected.

One of the advantages is that gradually increased quantities of air are furnished as the speed of the motor increases.

Other objects and advantages will be fully explained in the following description, and the invention will be more particularly pointed out in the claims.

Reference is had to the accompanying drawings which form a part of this application.

Figure 1 is a plan view of a plug containing the improved valve. Fig. 2 is a longitudinal section, taken on the line $x$—$x$ of Fig. 1.

Similar characters of reference are used to indicate the same parts throughout the several views.

The air feed consists of a cylindrical head 3 which has a plurality of ducts 4 in the outer end and small ducts 5, 6 and 7, connect the ducts 4 with one larger duct 8 at the discharge end of the plug or head 3. The head 3 has a reduced portion 9 which is threaded to be inserted in an opening tapped in the device to which the valve is to be attached. Small plugs 10, 11, and 12 are screwed into the ducts 4. These plugs have small ducts 13, 14, and 15 respectively gradually increasing in size for letting in air. Valves 16 are used to close the ducts 13, 14, and 15 when the ducts are not taking air. The valves are held against the plugs by springs 17, 18, and 19, the spring 18 being larger than spring 17 and spring 19 being larger than spring 18. The inner ends of the plugs 10, 11, and 12 are cup-shaped to receive the balls 16. The plugs 10, 11, and 12 are locked in position by lock-nuts 20 and these plugs may be used to regulate the tension of the springs 17, 18, and 19.

The operation is as follows:—As soon as a vacuum is created in the passages 4 as will be true when a greater quantity of air is required, the weakest spring 17 will let the valve 16 open the smallest duct 13 so that air will come in, and as more air or other fluid is required, the next stronger spring 18 will let the valve 16 open the next larger duct 14, and as the demand increases, the largest or strongest spring 19 will let the ball 16 open the duct 15 for air to come in for supplying the increased demand for air. Thus any vacuum in the ducts 4 will tend to cause the pressure from the atmosphere to overcome the tension of the springs 17, 18, and 19. There will thus be a plurality of valves, opening successively to supply the increased requirement of air.

What we claim, is,—

1. An auxiliary air feed for carbureters comprising a plug, said plug having a plurality of longitudinal ducts therein and angular ducts leading from the longitudinal ducts to a common duct in said plug, air duct plugs screwed into said longitudinal ducts, valves for closing said air duct plugs, and a plurality of springs of different tension for controlling the movement of said valves.

2. An auxiliary air feed for carbureters comprising a plug, said plug having a central duct and a plurality of longitudinal ducts connected to said central duct by angular ducts, plugs screwed into said longitudinal ducts and having graduated air ducts therethrough leading from the atmosphere to said longitudinal ducts, springs in said longitudinal ducts graduated in size and tension, and valves adapted to close the ducts through said plugs and held in place by said springs but movable as said springs yield.

3. An auxiliary air feed for carbureters comprising a head or plug, said head having a central duct and a plurality of longitudinal ducts connected to said central duct by angular ducts, plugs screwed into said longitudinal ducts and having graduated air ducts therethrough leading from the atmosphere to said longitudinal ducts and having their inner ends cup-shaped, springs in said longitudinal ducts graduated in size and tension according to the openings through said plugs, the weakest spring being in line with the smallest duct, and valves in said longitudinal ducts adapted to engage the cup-shaped ends of said plugs to close said openings, but movable as said springs yield to open said plugs, each plug being opened successively commencing with the plug having the smallest opening.

In testimony whereof, we set our hands this 6th day of May, 1916.

THOMAS M. BILLS.
THOMAS H. HARVEY.